2,993,051
PROCESS FOR MAKING NICOTINAMIDE
Anthony Truchan, Jr., and John B. Davidson, Skaneateles, N.Y., assignors to Cowles Chemical Company, Cleveland, Ohio, a corporation of Ohio
No Drawing. Filed Feb. 26, 1958, Ser. No. 717,570
6 Claims. (Cl. 260—295.5)

The present invention relates to a method for the purification of crude nicotinamide, and is more particularly concerned with such a method whereby nicotinamide meeting U.S.P. specifications is obtained.

The use of nicotinamide as a medical agent is now firmly established. As the importance of nicotinamide has become of greater significance, the requirements as to purity of the medicinal product have been correspondingly raised, with the result that methods which at one time gave a product of requisite purity are no longer satisfactory. Among the present requirements for medicinal grade nicotinamide given in U.S.P. XII are a melting point of 128 to 131 degrees centigrade, an ash content of 0.1 percent maximum, and a water solution that is neutral to litmus.

It is an object of the present invention to provide a method for obtaining a pure medicinal grade of nicotinamide from material containing nicotinamide along with impurities which render it unacceptable for medicinal use. Another object of this invention is the provision of a method whereby color may be removed from crude nicotinamide. A further object is the provision of a method whereby acceptably ash-free nicotinamide may be obtained. Other objects of the invention will become apparent hereinafter.

According to customary procedure, nicotinamide is prepared by the action of ammonia on nicotinic acid or an ester thereof. These ammonolysis reactions do not go to completion, and, as a result, nicotinamide, nicotinic acid, ammonium nicotinate are all present in admixture in the reaction product. Among the methods proposed to give nicotinamide of unstated purity are those of Hultquist, U.S. Patent 2,314,843, and Seibert et al., U.S. Patent 2,280,040.

Attempts have been made, as indicated in the cited Hultquist patent, to remove the bulk of the impurities from crude nicotinamide by the employment of calcium hydroxide. However, the last traces of impurities, according to this proposed method, are not removed except by an extended decolorization and crystallization procedure.

A review of the effect of impurities on the physical constants of nicotinamide is given by Mikkelsen in the Arch. for Pharmacie og Chemie (Denmark) 46, 279–97 (1939). This publication shows clearly that the purity of a sample of nicotinamide is difficult to predict from its melting point, as certain impurities commonly associated with nicotinamide do not produce any depression. This is particularly true of inorganic salts such as calcium nicotinamide. Thus, to assure satisfactory purity of the final product, extensive purification procedures have been devised and employed.

The separation of nicotinamide from the unreacted nicotinic acid is a difficult and expensive process. The purification of the nicotinamide from the colored bodies can be accomplished by activated carbon treatments and/or recrystallization from various solvents. One such method of separation involves suspending the crude nicotinamide in an aromatic solvent containing a tertiary aliphatic amine which forms a soluble amine salt with the unreacted nicotinic acid. The insoluble nicotinamide is filtered off. Another method of separation is to dissolve the crude nicotinamide in cold water saturated with gaseous ammonia or ammonium sulfate. Nicotinamide is insoluble in such a solution and is recovered by filtration. Still another method of separation involves dissolving the crude nicotinamide in wet, hot organic solvent such as methyl isobutylketone, adding sufficient calcium hydroxide to just form insoluble calcium nicotinate which is filtered off after first azeotropically distilling off all of the water present. Upon cooling the filtrate, nicotinamide precipitates from solution and is recovered by separating from the liquid portion.

In accordance with the present invention, nicotinamide can be easily and inexpensively separated from nicotinic acid by dissolving the mixture of the two in an anhydrous boiling lower aliphatic alkyl ester of a lower aliphatic acid, and then bubbling in an excess of anhydrous ammonia at or near the boiling point of the solution. By this process, nicotinic acid is converted into insoluble ammonium nicotinate and is filtered off. The removal of nicotinic acid by this method is quantitative. The hot filtrate contains the nicotinamide in solution. The nicotinamide is recovered by cooling the solution and filtering off the precipitated nicotinamide. The nicotinamide thus obtained is free of nicotinic acid and can be further purified by recrystallizing from suitable solvents and/or treatments with activated carbon or activated clays.

A preferred method of obtaining pure nicotinamide is to dissolve crude nicotinamide containing nicotinic acid in hot ethyl acetate and then passing in gaseous ammonia at 60°–70° C. to form insoluble ammonium nicotinate followed by removal of the ammonium nicotinate by filtration. The filtrate or liquid portion thus obtained is treated with activated carbon and activated clay at the boiling point to decolorize the solution and to remove trace impurities. The mixture is filtered hot to remove the spent carbon and clay and the filtrate may be treated two more times with fresh activated carbon and clay as before. The final filtrate is cooled to precipitate white crystalline nicotinamide which is of U.S.P. Grade.

The following examples illustrate in detail the operation of this invention. Numerous variations of these examples will be immediately apparent, consequently these examples are illustrative and do not limit the scope of the invention.

*Example 1*

Gaseous ammonia was passed into nicotinic acid at a temperature between 200–235° C. until the conversion to nicotinamide was 85%. The reaction mixture was colored light brown. The reaction mass was cooled and grounds to a fine powder. Fifty grams of this crude nicotinamide were boiled with 500 ml. of anhydrous ethyl acetate until a dark solution was obtained. A little solid remained in suspension. Gaseous ammonia was passed in below the surface of the ethyl acetate at a temperature between 60–70° C. After a short time ammonium nicotinate started to precipitate out of solution as a brown solid. Sufficient gaseous ammonia was passed into the ethyl acetate solution to insure complete precipitation of the nicotinic acids as ammonium nicotinate. The solution was filtered at about 60–70° C. The filter cake consisted of ammonium nicotinate, which, upon drying, weighed 12.4 grams. The filtrate was stirred and boiled for 20 minutes with one-half gram of activated carbon and two grams of activated adsorbent clay. The mixture was filtered hot. The filtrate was boiled twenty minutes with one-half gram of activated carbon and two grams of activated adsorbent clay and then filtered hot. The carbon and clay treatment was repeated once more. The final filtrate was cooled slowly with stirring to room temperature to precipitate white crystalline nicotinamide which, upon drying, weighed 26.7 grams and had a melting point of 129.5° C., and was over 99 percent pure. The mother liquor from the above filtration was boiled down to one-third of its volume and cooled to room temperature. A second crop of nicotinamide of three grams was obtained.

Example II

Gaseous ammonia was passed into nicotinic acid at a temperature between 200–235° C. until the conversion to nicotinamide was 81 percent. Upon cooling to room temperature, the reaction mixture solidified. Fifty grams of this crude nicotinamide were ground to a fine powder and boiled with 500 grams of anhydrous ethyl acetate until a dark solution was obtained. A little solid remained in suspension. Sufficient gaseous ammonia was bubbled in below the surface of the hot ethyl acetate to precipitate all of the nicotinic acid as ammonium nicotinate. The slurry was filtered hot. The filter cake consisted of ammonium nicotinate which, upon drying, weighed 14 grams. The filtrate was treated with one-half gram of activated carbon for twenty minutes at reflux temperature and then filtered hot. The filtrate was cooled to room temperature to precipitate nicotinamide which was filtered from solution. The nicotinamide thus obtained was free of nicotinic acid and ammonium nicotinate and had a melting point of 127.5° C.

Example III

Gaseous ammonia was passed into nicotinic acid at a temperature between 200–235° C. until the conversion to nicotinamide was 84 percent. Upon cooling to room temperature, the reaction mixture solidified. Fifty grams of this crude amide were crushed to a fine powder and boiled with 500 ml. of anhydrous ethyl acetate until solution took place. A little solid remained in suspension. Sufficient gaseous ammonia was bubbled in below the surface of the hot ethyl acetate to precipitate all of the nicotinic acid as ammonium nicotinate. The slurry was filtered hot. The filtrate was treated with one-half gram of activated carbon at the boiling point for twenty minutes and filtered. The resulting filtrate was cooled to room temperature to precipitate nicotinamide which was recovered by filtration. The nicotinamide thus obtained was redissolved in 500 ml. of boiling ethyl acetate and treated with one-half gram of activated carbon at the boiling point for twenty minutes. The solution was filtered hot. The activated carbon treatment was repeated on the filtrate once more. The final filtrate was cooled to room temperature and the precipitated white crystalline nicotinamide recovered by filtration. The yield was 25 grams and the melting point 129° C.

Example IV

Gaseous ammonia was passed into nicotinic acid at a temperature between 200–235° C. until the conversion to nicotinamide was 85 percent. Upon cooling to room temperature, the reaction mixture solidified. Fifty grams of this product were crushed to a fine powder and dissolved in 500 ml. of n-butyl acetate kept at a temperature of 70–80° C. Gaseous ammonia was bubbled in below the surface of the hot n-butyl acetate until the precipitation of ammonium nicotinate was complete. The slurry was filtered hot. The filtrate was treated with one gram of activated carbon at 70–80° C. for twenty minutes and filtered hot. The resulting filtrate was cooled to room temperature to precipitate the nicotinamide which was recovered by filtration. The melting point was found to be 127.5° C.

Various esters can be used as solvents for the removal of nicotinic acid as insoluble ammonium nicotinate from nicotinamide by the process of this invention. In general, the lower aliphatic alkyl esters of the lower aliphatic acids are suitable. Methyl acetate, normal propyl acetate, isopropyl acetate, normal butyl acetate, isobutyl acetate, secondary butyl acetate and pentyl acetate can be used as solvents. The lower aliphatic alkyl esters of propanoic and butanoic acids can also be used as solvents; however, it is preferred to use the acetate esters such as ethyl or n-butyl acetate.

The temperature at which gaseous ammonia is bubbled into a solution of nicotinic acid and nicotinamide dissolved in the ester solvent is important and must be controlled within certain limits, depending upon the ester solvent used. For example, when gaseous ammonia is bubbled into a solution of nicotinic acid and nicotinamide dissolved in n-butyl acetate at 100° C. or over, little or no ammonium nicotinate precipitates out of solution. At 80° C. essentially complete precipitation of ammonium nicotinate occurs and a temperature of 70–80° C. is preferred when n-butyl acetate solvent is used. It is possible to bubble gaseous ammonia into a solution of nicotinic acid and nicotinamide dissolved in n-butyl acetate at a temperature of 100° C. or above, and then cool to 70–80° C. before filtration. However, it is preferred to operate at 70–80° C. for the entire process.

The recovery of unreacted nicotinic acid as ammonium nicotinate by filtration is a distinct economic advantage over processes described in prior art. The recovered ammonium nicotinate can be heated with gaseous ammonia at about 235° C. and converted to more nicotinamide without any preliminary chemical treatments. It can also be added to the next nicotinic acid charge to be converted to nicotinamide. According to the prior art, the nicotinic acid, which was separtaed from the nicotinamide, is recovered as the tertiary amine salt, or the calcium salt, or is in a solution of concentrated ammonium hydroxide and is not suitable for reuse without a preliminary costly chemical treatment.

Nicotinamide prepared from heating nicotinic acid and ammonia at 200–235° C. contains colored bodies and traces of impurities. The colored bodies and impurities are easily removed by activated carbon treatments. It has been found that the colored bodies are most easily removed by activated carbon and the other trace impurities by activated clay. Good commercial grades of activated carbons and clays may be used. It is preferred to combine the carbon and clay in one operation, although they can be run as separate operations.

Various modifications may be made without departing from the spirit or scope of the invention, and it is understood that there are no proposed limitations other than those necessitated by the scope of the appended claims.

We claim:

1. In a process for making nicotinamide, the improvement whereby a therapeutically satisfactory product is obtained which comprises dissolving an impure reaction product containing nicotinamide and nicotinic acid in a solvent consisting of an ester of an alkanol of from 1 to 5 carbon atoms with an alkanoic acid of from 1 to 4 carbon atoms, and introducing gaseous ammonia into the impure mixture to convert the nicotinic acid to insoluble ammonium nicotinate, separating the insoluble phase, and recovering crystalline nicotinamide from said solution.

2. The process of claim 1 wherein the solvent is ethyl acetate.

3. The process of claim 1 wherein the solvent is methyl acetate.

4. The process of claim 1 wherein the solvent is n-butyl acetate.

5. The process of claim 1 wherein the solvent is n-propyl acetate.

6. The process of claim 1 wherein the solvent is isopropyl acetate.

References Cited in the file of this patent

UNITED STATES PATENTS

| Number | Name | Date |
|---|---|---|
| 2,496,114 | Berg | Jan. 31, 1950 |
| 2,511,244 | Carlson | June 13, 1950 |
| 2,617,805 | Wissow | Nov. 11, 1952 |
| 2,752,355 | Lustig | June 26, 1956 |